United States Patent [19]

Osanai

[11] 4,406,946

[45] Sep. 27, 1983

[54] PULSE SIGNAL GENERATING DEVICE FOR TAPE RECORDER

[75] Inventor: Akira Osanai, Hachioji, Japan

[73] Assignee: Olympus Optical Co., Ltd., Tokyo, Japan

[21] Appl. No.: 279,326

[22] Filed: Jul. 1, 1981

[30] Foreign Application Priority Data

Jul. 11, 1980 [JP] Japan ............................ 55-94794
Jul. 11, 1980 [JP] Japan ......................... 55-97803[U]
Jul. 11, 1980 [JP] Japan ......................... 55-97961[U]

[51] Int. Cl.³ ............................................ G01D 5/34
[52] U.S. Cl. ............................ 250/231 SE; 356/395
[58] Field of Search .............. 250/231 SE, 237 G; 356/395; 340/347 P

[56] References Cited

U.S. PATENT DOCUMENTS 4,097,726 6/1978 Satoh .

Primary Examiner—David C. Nelms
Assistant Examiner—Darwin R. Hostetter
Attorney, Agent, or Firm—Frishauf, Holtz, Goodman and Woodward

[57] ABSTRACT

The pulse signal generating device for a tape recorder comprises a rotary plate attached to a rotating shaft portion of the tape recorder which rotates in connection with tape running. The rotary plate has a central axis, and rotates together with the rotating shaft portion around the central axis. The outer peripheral surface of the rotating body includes at least one first surface portion with a higher reflection factor and at least one second surface portion with a lower reflection factor. The first and second surface portions adjoin each other along the circumferential direction, and are located at different distances from the central axis. The pulse signal generating device further comprises a photo-reflector facing the outer peripheral surface of the rotary plate. The photo-reflector includes a light emitting element for emitting light toward the outer peripheral surface and a light receiving element to receive light reflected from the outer peripheral surface. The light receiving element produces pulse signals in response to light reflected from the first and second surface portions, severally.

16 Claims, 7 Drawing Figures

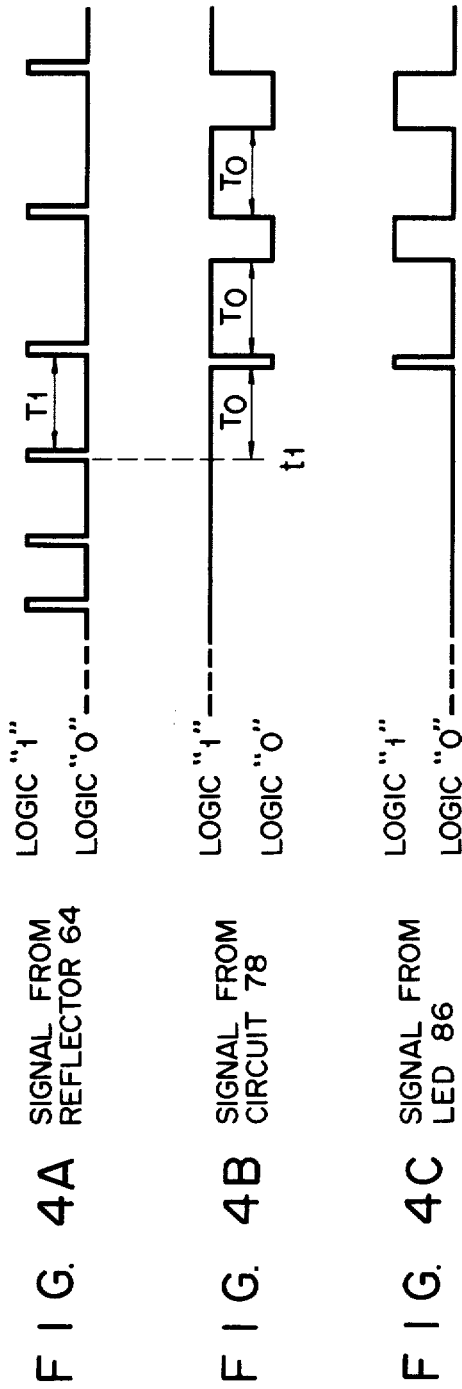

4,406,946

PULSE SIGNAL GENERATING DEVICE FOR TAPE RECORDER

BACKGROUND OF THE INVENTION

This invention relates to a pulse signal generating device for a tape recorder, and more particularly to a pulse signal generating device for optically detecting the number of revolutions or the speed at which a shaft of a tape recorder rotates.

Generally, a tape recorder needs a device which optically detects the number of revolutions or speed of rotation of reel shafts so that an automatic shut-off or an electronic counter, for example, may be timely driven. Known as such a device is a pulse signal generating device which has a direct light-transmitting type photocoupler. The pulse signal generating device, however, is expensive and is large, thus occupying a large space. Another device known and used as such is a pulse generating device which has a hole element for detecting changes in magnetic field intensity that occur as a rotary member having a magnet rotates together with reel shafts. To manufacture this pulse signal generating device it is necessary to magnetize a portion of the rotary member and to embed a magnet in a portion of the rotary member. These steps require many man-hours, and the device is inevitably expensive.

SUMMARY OF THE INVENTION

The object of the present invention is to provide a compact reduced cost pulse signal generating device for a tape recorder.

According to an aspect of this invention, there is provided a pulse signal generating device for a tape recorder, which comprises a rotary member attached to a rotating shaft portion of the tape recorder, having a central axis, and rotating together with the rotating shaft portion around the central axis, the outer peripheral surface of the rotary member including at least one first surface portion with a predetermined light reflection factor and at least one second surface portion with a light reflection factor different from such predetermined reflection factor, the first and second surface portions adjoining each other along the circumferential direction. The rotary member rotates together with a reel hub engaging member of the tape recorder. A photo-reflector faces the outer peripheral surface of the rotary member and includes a light emitting element to emit light toward the outer peripheral surface of the rotary member and a light receiving element to receive light reflected from the outer peripheral surface of the rotary member, and light receiving element producing pulse signals in response to reflected lights from the first and second surface portions, severally. The light emitting and light receiving elements are flush with each other.

BRIEF DESCRIPTION OF THE DRAWINGS

FIG. 4A shows a pulse signal delivered from a photo-reflector;

FIG. 4B shows a pulse signal delivered from a retriggerable one-shot circuit;

FIG. 4C shows how an LED goes on and off; and

DETAILED DESCRIPTION OF THE PREFERRED EMBODIMENT

Figure 1:
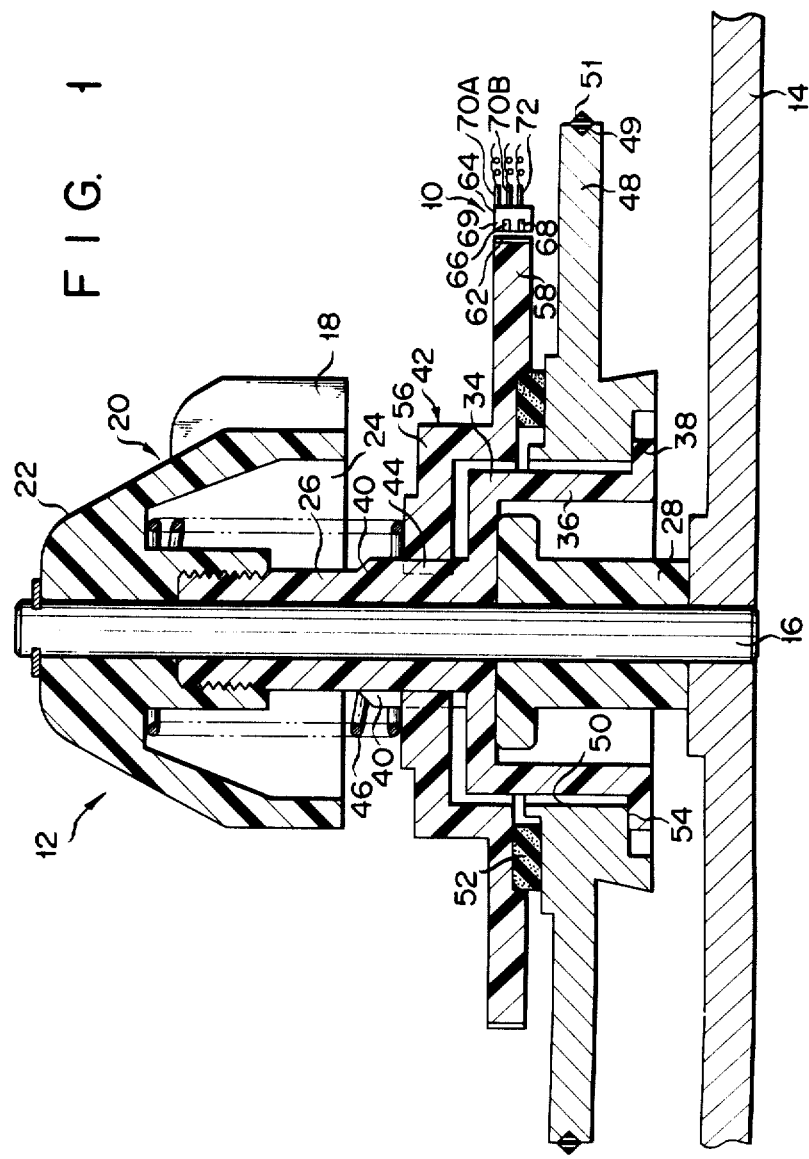
FIG. 1 is a sectional view of a pulse signal generating device for a tape recorder according to one embodiment of this invention.

Now there will be described a pulse signal generating device for a tape recorder according to one embodiment of this invention with reference to the accompanying drawings. In this embodiment, the pulse signal generating device 10 is attached to a reel shaft mechanism 12, as shown in FIG. 1.

The reel shaft mechanism 12 is provided with a central shaft 16 the lower end of which is fixed to a chassis 14. Mounted on the upper end portion of the central shaft 16 is a reel hub engaging member 20 concentric with the central shaft 16 having an engaging means 18 which engages a reel hub (not shown) along the circumferential direction of the central shaft 16. The reel hub engaging member 20 includes an upper component 22 formed substantially in the shape of a truncated cone to facilitate the setting of the reel hub. The upper component 22 is rotatable around the central shaft 16. The engaging means 18 is attached to the outer surface of the upper component 22. In this embodiment, the engaging means 18 is formed of three wings which extend outward in the radial direction of the central shaft 16. An annlar groove 24 concentric with the central shaft 16 is formed in the bottom end face of the upper component 22.

Further, the reel hub engaging member 20 includes a substantially cylindrical lower component 26 which extends downward from the upper component 22 along the circumferential surface of the central shaft 16. The lower component 26 is rotatable around the central shaft 16. The upper end portion of the lower component 26 is fixed to the upper component 22 by e.g. screwing. Located under the lower component 26 is a cylindrical sleeve 28 capable of rotating around the central shaft 16 under the upper component 22. The lower end face of the sleeve 28 slidably abuts on the top surface of the chassis 14.

Formed on the middle portion of the lower component 26 is a first flange 34 which projects outward in the radial direction of the central shaft 16. The under surface of the first flange 34, which is finished smooth so that an object in contact therewith can slide thereon, slidably abuts on the top end face of the sleeve 28. Fixed to the outer periphery of the under surface of the first flange 34 is the upper end portion of an annular ring 36 which is concentric with the central shaft 16. The lower end of the ring 36 is located near the under surface of a pulley 48 as mentioned later. Formed on the outer periphery of the lower end of the ring 36 is a second flange 38 which projects outward in the radial direction of the central shaft 16 along the under surface of the pulley 48. The top surface of the second flange 38, which bears thereon the under surface of the pulley 48, is finished smooth so that the pulley 48 can slide thereon. The circumferential surface of the lower component 26 is fitted with a plurality of wings 40 which project in the radial direction of the central shaft 16, and extend along the axial direction of the shaft 16.

The top surface of the first flange 34 is separated from the under surface of the upper component 22 along the axial direction of the central shaft 16. Between these two surfaces there is a rotaty plate 42 as one component of the pulse signal generating device, disposed concentrically with the central shaft 16. The rotary plate 42 is in the form of a flange projecting outward in the radial direction of the central shaft 16, and is slidable in the axial direction of the central shaft 16 along the outer circumferential surface of the lower component 26. Formed in the rotary plate 42 are grooves 44 which severally engage the wings 40 to cause the rotary plate 42 to rotate together with the lower component 26 around the central shaft 16. A compression coil spring 46 concentric with the central shaft 16 is interposed between the top surface of the rotary plate 42 and the top surface in the groove 24 of the upper component 22. The upper and lower ends of the compression coil spring 46 are compressedly pressed against the top surfaces of the groove 24 and the rotary plate 42, respectively and the upper component 22 is prohibited to move upward by a snap ring, so the rotary plate 42 is urged by the urging force of the compression coil spring 46 to move downward as shown in FIG. 1, that is, in the direction to approach the first flange 34. The outer periphery of the rotary plate 42 radially projects outward beyond the outer periphery of the first flange 34. The aforementioned discoid pulley 48 concentric with the central shaft 16 is rotatably disposed between the under surface of the outer periphery of the rotary plate 42 and the top surface of the second flange 38. Formed in the center of the pulley 48 is a circular hole 50 whose diameter is larger than the outside diameter of the ring 36 and shorter then the outside diameter of the second flange 38. Thus, the ring 36 is loosely fitted in the circular hole 50 of the pulley 48.

Formed in the outer circumferential surface of the pulley 48 is a groove 49 flush with a groove formed on a pulley of an electric motor (not shown). A belt 51 is stretched between the respective grooves of these pulleys.

A rotation transmitting means 52 is interposed between the under surface of the outer periphery of the rotary plate 42 and the top surface of the pulley 48. In this embodiment, the rotation transmitting means 52 is formed of an annular pressure-bonding felt pad. The pressure-bonding pad 52 is disposed concentrically with the central shaft 16, and is fixed to the under surface of the outer periphery of the rotary plate 42 by well-known means such as adhesives. Since the rotary plate 42 is urged downward by the urging force of the compression coil spring 46 as mentioned before, the pressure-bonding pad 52 is pressed against the top surface of the pulley 48, and the under surface of the inner periphery of the pulley 48 is pressed against the top surface of the second flange 38. Thus, the reel hub engaging member 20 has a sliding surface 54 which engages and supports the pulley 48 along the axial direction of the central shaft 16 so that the pulley 48 may slide in the rotating direction.

Figure 2:
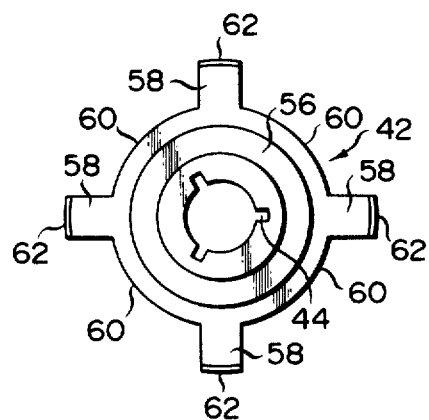
FIG. 2 is a plan view of a rotary plate used in the pulse signal generating device shown in FIG. 1.

As shown in detail in FIG. 2, the rotating plate 42 has a discoid main body 56 and a plurality of—four in this embodiment—projected portions 58 integrally surrounding the main body 56 and extending outward along the radial direction with the main body 56. These four projected portions 58 are arranged at regular intervals, and the outer periphery of each projected portion 58 is located outside the outer periphery of the main body 56 as viewed along the radial direction, forming a part of the circumference of a circle concentric with the main body 56. The main body 56 and the projected portions 58 are formed of dark plastic whose surface provides nonreflecting portions 60 (FIG. 2). On the other hand, silver leaves defining reflecting portions 62 are attached to the outer peripheral surfaces of the projected portions 58 by hot stamping.

A photo-reflector 64 as another component of the pulse signal generating device 10 is disposed so as to be able to face the outer peripheral surface of each projected portion 58 of the rotary plate 42. The photo-reflector 64 comprises an LED 66 as a light emitting element having a light emitting surface to emit light, a photo-transistor 68 as a light receiving element having a light receiving surface to receive light and producing a pulse signal with every reception of light, and a housing 69 containing the LED 66 and the photo-transistor 68 so that the light emitting and receiving surfaces may be flush with each other. The light emitting element 66 is located so that it may emit light beams toward the outer peripheral surface of the rotary plate 42, while the light receiving element 66 is located so that it may receive, out of the light beams from the light emitting element 66, only those beams which are reflected by the rotating reflecting portions 62 after reaching the same.

Figure 3:
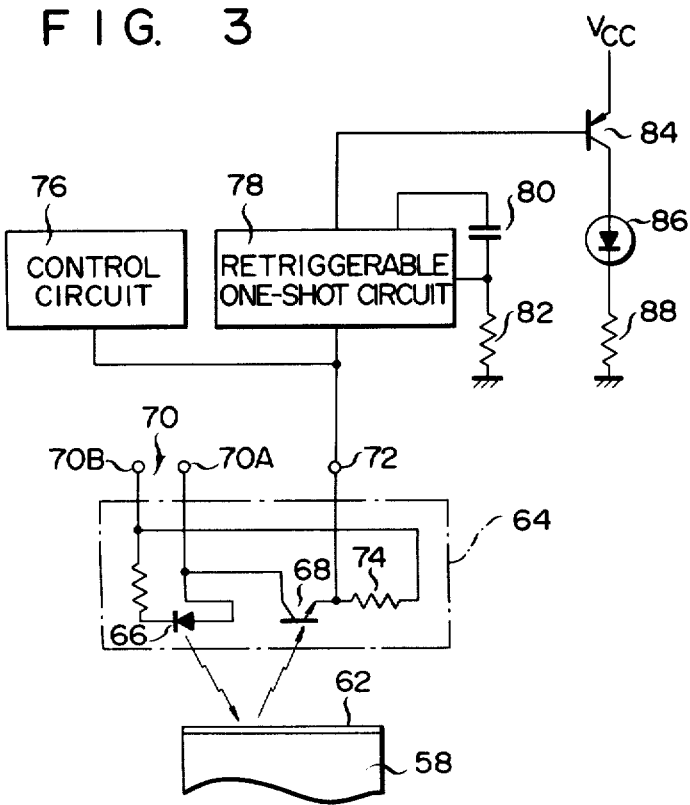
FIG. 3 is an electrical circuit diagram of the device of FIG. 1.

The photo-reflector 64 is constructed as shown in FIG. 3. That is, a positive terminal 70A out of input terminals 70 is connected to the anode of the LED 66 whose cathode is connected to a negative terminal 70B through a resistor. The positive terminal 70A is connected also to the collector of the photo-transistor 68. The emitter of the photo-transistor 68 is connected to an output terminal 72, and also to the negative terminal 70B through a resistor 74. The output terminal 72 is connected to a control circuit 76 and a retriggerable one-shot circuit 78. The control circuit 76 detects one revolution of the reel shaft mechanism 12 with every four pulse signals it receives. A predetermined voltage is applied to the positive terminal 70A out of the input terminals 70, and the negative terminal 70B is grounded.

The retriggerable one-shot circuit 78 produces one pulse signal with a predetermined pulse width $T_0$ in response to one input pulse signal from the photo-reflector 64. The circuit 78 is connected with a capacitor 80 and a resistor 82. The pulse width $T_0$ can freely be determined by suitably setting the respective values of the capacitor 80 and resistor 82. The output terminal of the circuit 78 is connected to the base of a PNP-type transistor 84. The collector of the transistor 84 is connected to the anode of a light emitting diode 86. The cathode of the light emitting diode 86 is grounded through a resistor 88. A predetermined voltage $V_{CC}$ is applied to the emitter of the transistor 84.

Now there will be described the operation of the pulse signal generating device 10 of the above-mentioned construction.

The rotation of the motor (not shown) is transmitted to the pulley 48 by means of the belt 51 to rotate the pulley 48. The rotation of the pulley 48 is transmitted through the pressure-bonding pad 52 to the rotary plate 42, and the rotation of the rotary plate 42 is transmitted to the lower and upper components 26 and 22 with the aid of the engagement between the wings 40 and the grooves 44. Accordingly, the reel hub engaging member 20 attached to the upper component 22 and the rotary plate 42 rotate with the same number of revolutions. Further, the difference between the numbers of revolutions of the pulley rotating at fixed speed and the reel shaft with its number of revolutions variable with the amount of wound tape is absorbed by means of the friction between the pressure-bonding pad 52 and pulley 48 to ensure smooth tape running.

Accompanying the rotation of the rotary plate 42, the reflecting portions 62 attached to the rotary plate 42 also rotate. In the light emitting element 66 of the photo-reflector 64, on the other hand, a voltage is applied between the pair of input terminals 70 to cause light beams to be emitted successively, accompanying the start of rotation of the motor. While the photo-reflector 64 is facing the nonreflecting portion 60, light from the LED 66 is not reflected by the non-reflecting portion 60, so that the photo-transistor 68 receives no light. Accordingly, no current flows across the resistor 74, and no output voltage is produced.

Further, when the rotary plate 42 rotates to bring the reflecting portion 64 to a position where it can reflect the light from the LED 66 to the photo-transistor 68, the photo-transistor 68 receives the light from the LED 66 which is reflected by the reflecting portion 62. As a result, a current flows through the base of the photo-transistor 68, running from the collector to the emitter. Then, a predetermined voltage corresponding to the value of the current is generated across the resistor 74, and a predetermined output voltage appears between the output terminal 72 and the negative terminal 70B.

When the rotary plate 42 rotates to cause the nonreflecting portion 60 again to face the photo-reflector 64, the output voltage ceases to be generated across the resistor 74.

Thus, the output voltage from the photo-reflector 64 is supplied as a pulse signal to the control circuit 76 and the retriggerable one-shot circuit 78 via the output terminal 72.

According to this embodiment, the rotary plate 42 ceases to rotate when the tape running is stopped. Therefore, the use of the pulse signal generating device 10 can ensure the detection of the rotation of the reel shaft, since the reflecting and non-reflecting portions 62 and 60 are formed of silver leaf and black plastics, respectively, and the reflecting portion 62 is located outside the nonreflecting portion 60 as viewed along the radial direction. Being no-contact detection, such rotation detection will never exert any influence upon the rotation system. Moreover, the use of the photo-reflector 64 with the light emitting and receiving elements on the same plane can ensure miniaturization of the device, reduced cost, and improved detection reliability.

Meanwhile, the pulse signal from the photo-reflector 64 is supplied also to the retriggerable one-shot circuit 78 connected with the photo-reflector 64. As the amount of a tape (not shown) wound around the reel hub (not shown) engaged with the reel shaft mechanism 12 increases, the number of revolutions of the rotary plate 42 gradually decreases to make the pulse duration of the pulse signal longer (as pulse width is constant), as shown in FIG. 4A. If the number of revolutions obtained $t_1$ second(s) before the whole tape is wound around the reel hub is N (r.p.s.), the number of pulses the circuit 78 receives through the output terminal 72 will be 4N per second. Accordingly, the pulse duration $T_1$ is $\frac{1}{4}N$ second. Then, the pulse width $T_0$ of the pulse signal delivered from the retriggerable one-shot circuit 78 is set under a condition, $T_0 \simeq T_1$, based on the first pulse interval $T_1$ after the time which is $t_1$ second before the tape end detection. The output signal from the retriggerable one-shot circuit 78 rises to "1" level in accordance with rise of the pulse signal from the photo-reflector 64 and the "1" level of the output signal is retained for $T_0$ second so as to provide the pulse width of the output signal. As a result, logic level "0" appears at the output terminal of the circuit 78, as shown in FIG. 4B, when the pulse duration obtained from the photo-reflector 64 exceeds $T_0$. In response to such "0" level output, the PNP-type transistor 84 is caused to conduct, and the LED 88 is turned on, as shown in FIG. 4C. The "on" time of the LED 88 becomes longer as the pulse duration of the signal from the photo-reflector 64 increases, that is, the number of revolutions of the rotary plate 42 decreases gradually. The LED 88 continues to glow after the tape winding is finished and the tape running is stopped. In this case, the LED 88 functions as a tape end alarm.

It is to be understood that this invention is not limited to the above-mentioned embodiment, and that various changes and modifications may be effected therein by one skilled in the art without departing from the scope or spirit of the invention.

Although four reflecting portions 62 are used in the above-mentioned embodiment, the number of the reflecting portions may be determined optionally.

In the above embodiment, moreover, the reflecting portions 62 are explained as being attached to the outer peripheral surfaces of the projected portions 58. Alternatively, however, the reflecting portions 62 may be disposed on the circular surface of the main body 56 of the rotary plate 42. With such construction, the projected portions 58 are unnecessary.

Figure 5:
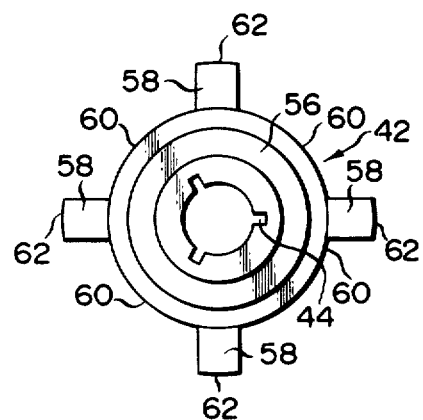
FIG. 5 is a plan view showing a modification of the rotary plate.

In the above embodiment, furthermore, the main body 56 and the projected portions 58 of the rotary plate 42 are formed of black plastic. Instead, for example, they may be formed of colored or transparent plastic which is coated black. In this case, the reflecting and nonreflecting portions 62 and 60 may be integrally formed of plastic with different reflection factors. As shown in FIG. 5, for example, the projected portions 58 and main body 56 of the rotary plate 42 may be integrally formed of white plastic and black plastic, so nonreflecting portions 60 and reflecting portions 62 are constituted by black surfaces and white surfaces, respectively.

For the reflecting portions 62, moreover, silver leaves are attached by hot stamping in the above embodiment. Alternatively, aluminium leaves may be attached by any other suitable means or method than the hot stamping.

In the embodiment, the pulse signal generating device 10 is explained as being used for the detection of the rotation of the reel shaft mechanism 12. Alternatively, however, the pulse signal generating device 10 may be attached to a capstan mechanism to provide pulse signals for motor control.

Furthermore, the LED used as the tape end alarm device in the above embodiment may be replaced with a buzzer.

What is claimed is:

1. A pulse signal generating device for a tape recorder having a rotatable reel hub engaging member and a rotating shaft portion coupled to said reel hub engaging member and which rotates in connection with tape running, comprising:

a rotary member attached to said rotating shaft portion of the tape recorder and coupled to said reel hub engaging member, said rotary member having a central axis, and said rotary member rotating together with said rotating shaft portion and said reel hub engaging member around said central axis, said rotary member having an outer peripheral surface which includes at least one first surface portion with a predetermined light reflection factor and at least one second surface portion with a light reflection factor different from said predetermined light reflection factor, said first and second surface portions adjoining each other along the circumferential direction of said rotary member; and a photo-reflector facing said outer peripheral surface of said rotary member and including a light emitting element to emit light toward said outer peripheral surface of said rotary member and a light receiving element for receiving light reflected from said outer peripheral surface of said rotary member, said light emitting element and said light receiving element being flush with each other, said light receiving element producing pulse signals in response to light reflected from the first and second surface portions, severally.

2. A pulse signal generating device according to claim 1, wherein said first surface portion has a high light reflection factor and is located at a predetermined distance from said central axis, and said second surface portion has a low light reflection factor which is lower than said high reflection factor and is located at a shorter distance than said predetermined distance from said central axis.

3. A pulse signal generating device according to claim 2, wherein said first and second surface portions are substantially white and black, respectively.

4. A pulse signal generating device according to claim 2, wherein said first and second surface portions are formed substantially smooth and rough, respectively.

5. A pulse signal generating device according to claim 2, wherein said first surface portion comprises silver leaf and said second surface portion comprises substantially black plastic material.

6. A pulse signal generating device according to claim 5, wherein said rotary member is formed of substantially black plastic material, and is provided with a silver leaf at a portion thereof at said predetermined distance from said central axis.

7. A pulse signal generating device according to claim 6, wherein said silver leaf is hot stamped silver leaf.

8. A pulse signal generating device according to claim 2, wherein said first surface portion comprises aluminium leaf and said second surface portion comprises substantially black plastic material.

9. A pulse signal generating device according to claim 8, wherein said rotary member is formed of substantially black plastic material, and is provided with an aluminium leaf at a portion thereof at said predetermined distance from said central axis.

10. A pulse signal generating device according to claim 9, wherein said aluminium leaf is hot stamped aluminium leaf.

11. A pulse signal generating device according to any one of claims 1–10, wherein said rotary member is provided with a plurality of said first surface portions and with a plurality of said second surface portions as many as said first portions.

12. A pulse signal generating device according to claim 11, wherein said plurality of first and second surface portions adjoin one another, and are arranged at regular intervals.

13. A pulse signal generating device according to claim 1, wherein said tape recorder includes a drive pulley for driving said rotating shaft; and said rotary member is coupled between said drive pulley and said reel hub engaging member for transmitting a driving force applied to said drive pulley to said reel hub engaging member by frictional engagement between said drive pulley and said rotary member.

14. A pulse signal generating device according to claim 3, wherein said rotary member is integrally formed of plastic material.

15. A pulse signal generating device according to claim 1, wherein said first and second surface portions are located at different distances from said central axis.

16. A pulse signal generating device according to claim 1, wherein said rotary member is fixedly connected to said reel hub engaging member so as to rotate in a one-to-one relationship therewith.

* * * * *